United States Patent [19]
Fushimi et al.

[11] Patent Number: 5,791,432
[45] Date of Patent: Aug. 11, 1998

[54] STEERING CONTROL APPARATUS FOR AN AUTOMOTIVE VEHICLE

[75] Inventors: Takehiko Fushimi, Kariya; Hisayasu Mase, Handa; Takeshi Hatano, Chiryu, all of Japan

[73] Assignee: Aisin Seiki Kabushiki Kaisha, Kariya, Japan

[21] Appl. No.: 633,376

[22] Filed: Apr. 17, 1996

[30] Foreign Application Priority Data

| Apr. 19, 1995 | [JP] | Japan | 7-119387 |
| Feb. 29, 1996 | [JP] | Japan | 8-071223 |

[51] Int. Cl.[6] ................................................ B62D 5/04
[52] U.S. Cl. ................................................ 180/412; 180/445
[58] Field of Search ................................................ 180/412, 414, 180/415, 444, 445

[56] References Cited

U.S. PATENT DOCUMENTS

| 4,898,258 | 2/1990 | Ohe et al. | 180/444 |
| 5,101,922 | 4/1992 | Ohmura | 180/445 |
| 5,135,067 | 8/1992 | Kohata et al. | 180/445 |
| 5,248,009 | 9/1993 | Takehara et al. | 180/445 |
| 5,289,891 | 3/1994 | Sugiyama | 180/445 |
| 5,311,956 | 5/1994 | Sugiyama | 180/412 |
| 5,573,079 | 11/1996 | Suda et al. | 180/444 |
| 5,595,089 | 1/1997 | Watanabe et al. | 180/445 |

FOREIGN PATENT DOCUMENTS 4-502591  5/1992  Japan

*Primary Examiner*—Randolph A. Reese
*Assistant Examiner*—John L. Beres
*Attorney, Agent, or Firm*—Burns, Doane, Swecker & Mathis, LLP

[57] ABSTRACT

In a steering control apparatus for an automotive vehicle, there are provided a steering mechanism which is linked with a road wheel to be controlled, an actuator for actuating the steering mechanism, and a steering angle sensor which is arranged in the vicinity of the steering mechanism for detecting a steered position of the road wheel. The apparatus includes a first control circuit which is provided for setting a desired steering angle of the road wheel, and includes a second control circuit which is electrically connected to the first control circuit, and which controls a current to be fed into the actuator in response to a difference between the desired steering angle and an actual steering angle which is produced on the basis of the steered position detected by the steering angle sensor, to control a steering angle of the road wheel. The second control circuit is formed as one body with the steering angle sensor and arranged in the vicinity of the steering mechanism. The second control circuit is electrically connected to the actuator through a connector, without a wiring harness.

10 Claims, 7 Drawing Sheets

STEERING CONTROL APPARATUS FOR AN AUTOMOTIVE VEHICLE

BACKGROUND OF THE INVENTION

1. Field of the Invention

The present invention relates to a steering control apparatus for use in an automotive vehicle, more particularly to a steering control apparatus which is preferably adapted to control a steering angle of a rear road wheel.

2. Description of the Related Arts

As to a steering control apparatus, a front steering control apparatus provided for modifying a steering angle of a front road wheel of a vehicle, and a rear steering control apparatus provided for adjusting a steering angle of a rear road wheel are known heretofore. For example, the rear steering control apparatus is arranged to set a desired steering angle of the rear road wheel to a certain value provided in accordance with driving conditions of the vehicle, and detect an actual steering angle of the rear road wheel, and then drive an actuator in response to a steering angle difference between the actual steering angle and the desired steering angle, thereby to control the steering angle of the rear road wheel.

According to the prior steering control apparatus for rear road wheels, a control circuit for controlling the steering angle is arranged in a compartment of the vehicle, while an actuator and a rear steering angle sensor are arranged outside of the compartment. Therefore, a wiring harness is needed in order to connect an electronic control unit with the actuator and rear steering angle sensor electrically, so that a lot of wires are to be provided, and as a result the apparatus is likely to be influenced by noise.

If the apparatus is provided with a first control circuit for providing a desired steering angle, and a second control circuit for feeding a driving signal to the actuator on the basis of a difference between the desired steering angle and the actual steering angle detected by the steering angle sensor, then the number of wires will be reduced, and the connection with the actuator will be made easily thereby to reduce the electric noise and loss of the electric power. However, as far as the prior wiring harness is used for electrically connecting the rear steering angle sensor with the second circuit, the electric noise will still be a problem to be solved.

SUMMARY OF THE INVENTION

Accordingly, it is an object of the present invention to provide a steering control apparatus for controlling a steering angle in response to a difference between a desired steering angle and an actual steering angle, wherein at least electric connection between a steering angle sensor and a control unit is properly made, without a wiring harness.

It is another object of the present invention to provide appropriate electric connections for components of a steering control apparatus including the first and second control circuits.

It is a further object of the present invention to arrange a steering angle sensor at a certain position of a steering control mechanism easily and properly.

In accomplishing these and other objects, a steering control apparatus for an automotive vehicle includes a road wheel to be controlled, a steering mechanism linked with the road wheel, an actuator for actuating the steering mechanism, and a steering angle sensor arranged in the vicinity of the steering mechanism for detecting a steered position of the road wheel. The steering control apparatus further includes a first control circuit which is provided for setting a desired steering angle of the road wheel, and includes a second control circuit which is electrically connected to the first control circuit for controlling a current to be fed into the actuator in response to a difference between the desired steering angle and an actual steering angle produced on the basis of the steered position, to control a steering angle of the road wheel. The second control circuit is formed as one body with the steering angle sensor and arranged in the vicinity of the steering mechanism.

Preferably, the second control circuit is arranged next to the actuator, and electrically connected to the actuator through a connector.

The steering control apparatus may further include a housing provided at a certain position relative to the steering mechanism, a plurality of support members each having one end fixed to the housing, and the other end extending toward the steering mechanism, and a base plate for mounting thereon the steering angle sensor and the second control circuit. Preferably, each of the support members has an engaging portion for supporting the base plate at a predetermined position remote from the steering mechanism by a certain distance.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
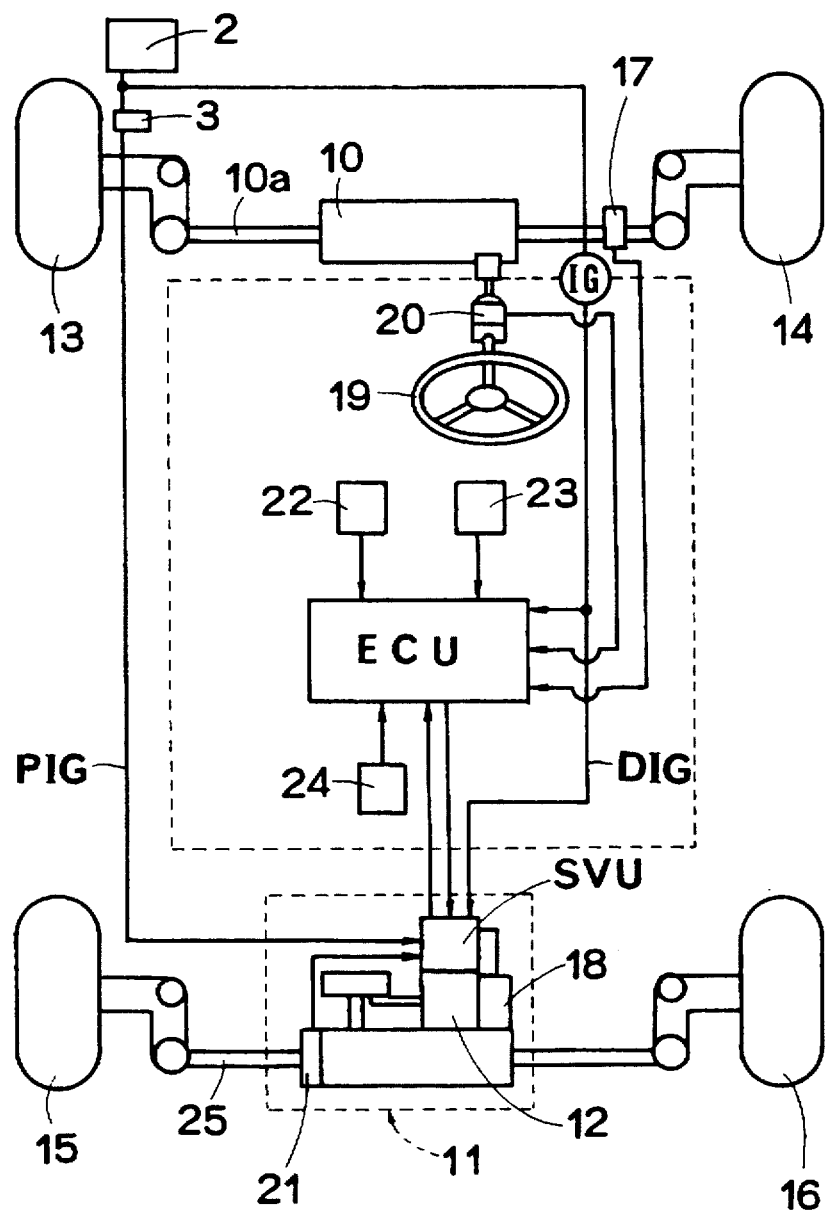
FIG. 1 is an overall diagram of a steering control apparatus for an automotive vehicle according to a first embodiment of the present invention.

Referring to FIG. 1, there is disclosed a rear wheel steering control apparatus, which steers rear road wheels in response to the steering operation of front road wheels of an automotive vehicle. In FIG. 1, front road wheels 13, 14 are arranged to be steered in response to the rotating operation of a steering wheel 19 by a front steering mechanism 10. The front steering mechanism 10 is provided with a sensor for detecting an axial position of a rack 10a, e.g., a front steering angle sensor 17 which includes a potentiometer, and feeds its output signal to an electronic control unit ECU provided in the vehicle. On a steering shaft of the steering wheel 19, there is mounted a steering wheel angle sensor 20 which includes a rotary encoder, and feeds its output signal to the electronic control unit ECU. The vehicle is further provided with a yaw rate sensor 24 which detects a varying rate of a rotational angle (yaw angle) about a vertical axis including a center of gravity of the vehicle, i.e., a yaw angular velocity (yaw rate), to feed a yaw rate γ to the electronic control unit ECU. Also provided are a wheel speed sensor 22 which detects a rotational speed of each of the road wheels, and a vehicle speed sensor 23 which is operatively mounted on a transmission (not shown) to detect a speed corresponding to a mean value of the wheel speeds of the road wheels operatively connected to the transmission, so that signals indicative of speeds Vw, Vm are fed from the sensors 22, 23 to the electronic control unit ECU, respectively.

Figure 2:
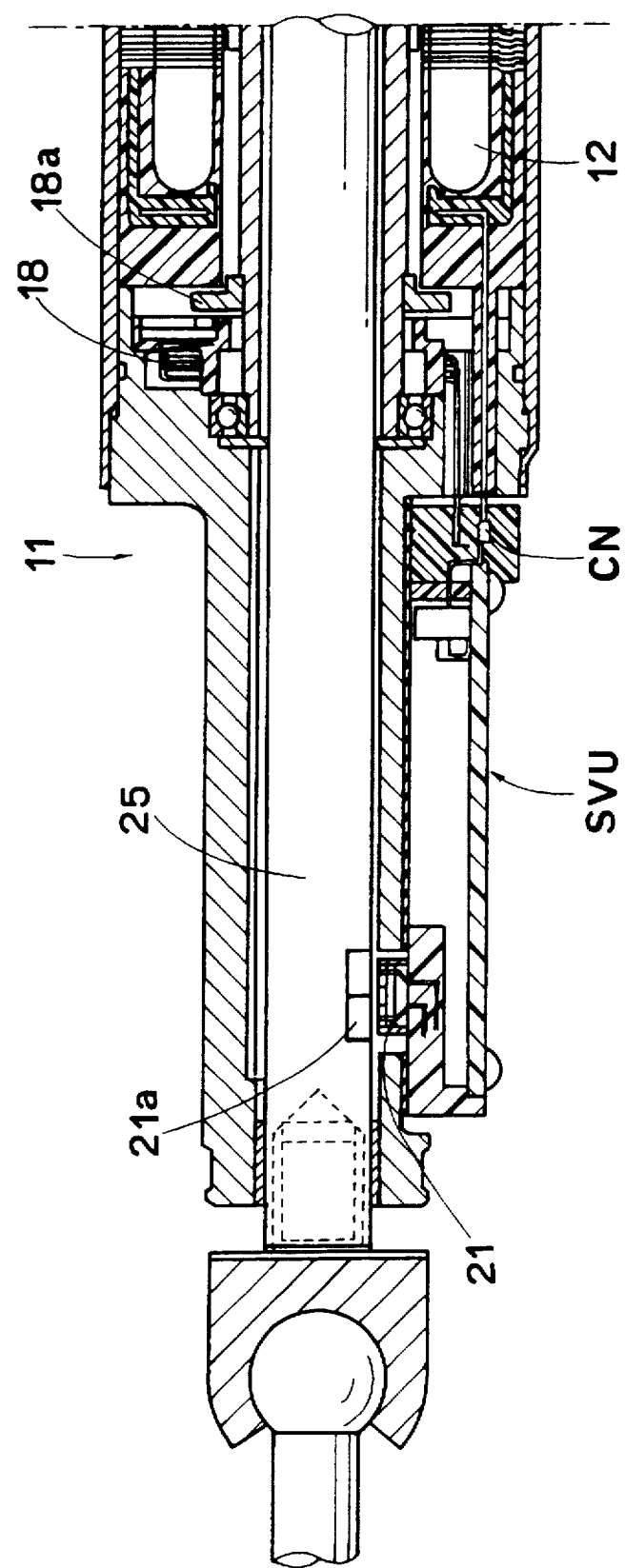
FIG. 2 is a sectional view of a part of a rear steering control mechanism according to the first embodiment of the present invention.
Figure 3:
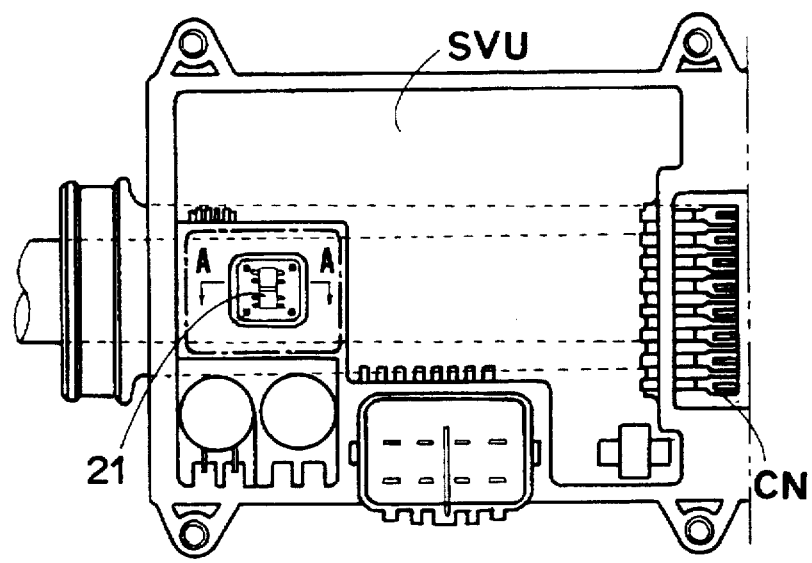
FIG. 3 is a partially sectioned view of a part of a rear steering control mechanism according to the first embodiment of the present invention.
Figure 4:
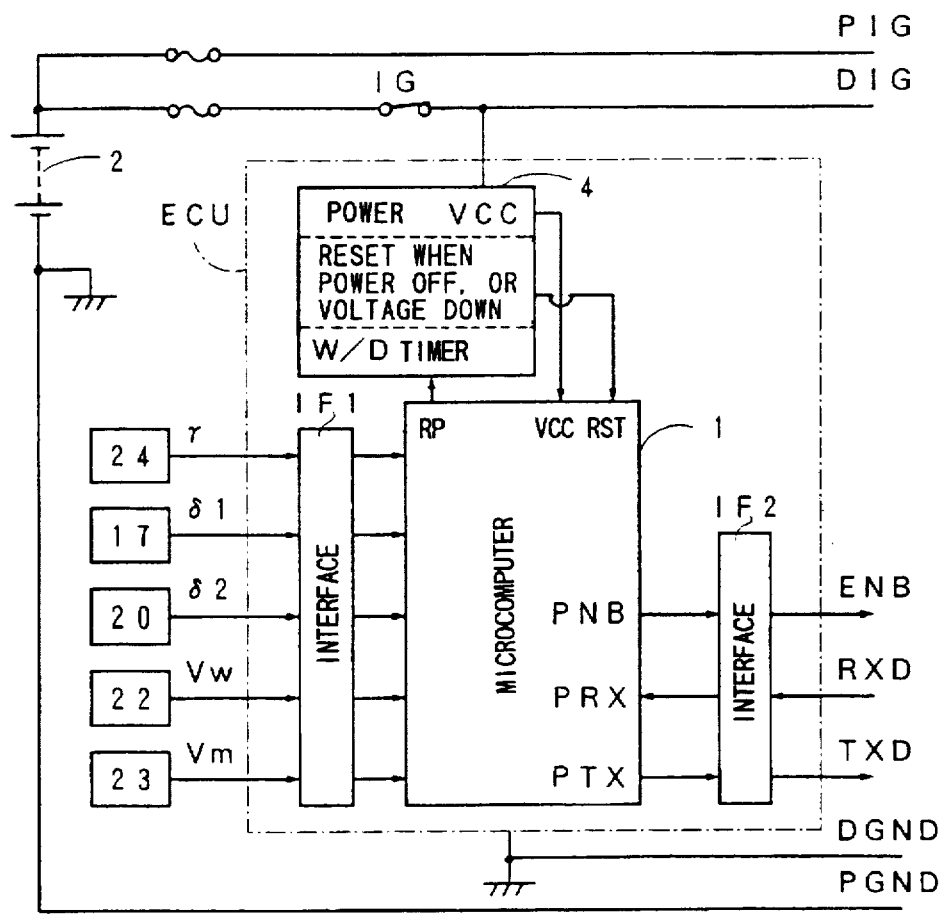
FIG. 4 is a circuit diagram of an electronic control unit provided for the first embodiment of the present invention.
Figure 5:
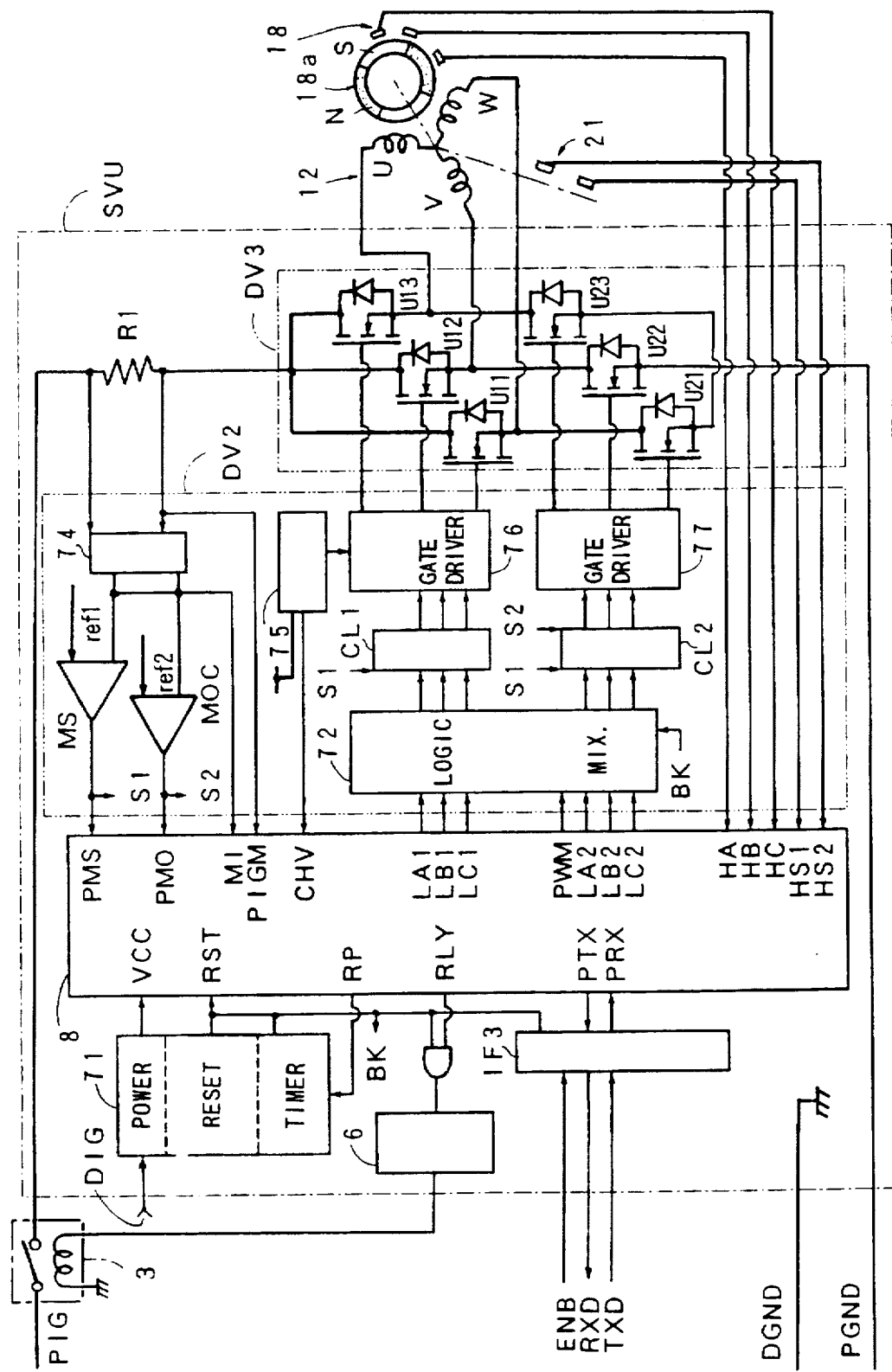
FIG. 5 is a circuit diagram of a servo unit provided for the first embodiment of the present invention.

A rear steering mechanism 11 is connected to rear road wheels 15, 16, so as to be steered in response to rotation of an electric motor 12 which serves as an actuator according to the present invention. The rear steering mechanism 11 of the present embodiment includes a servo unit SVU, an electric motor 12, a magnetic pole sensor 18 and a rear steering angle sensor 21, which are connected as shown in FIGS. 2 and 3. The electronic control unit ECU, which serves as a first control circuit according to the present invention, is constituted as shown in FIG. 4, and the servo unit SVU, which serves as a second control circuit according to the present invention, is constituted as shown in FIG. 5. According to the present embodiment, the servo unit SVU and the electric motor 12 are directly connected with each other through a connector CN, without any wiring harness, as shown in FIG. 2. Also, the rear steering angle sensor 21 is assembled into the servo unit SVU without any wiring harness.

The electric motor 12 of the present embodiment is a brushless three phase motor, on an axial end of which the magnetic pole sensor 18 is mounted to serve as a relative steering angle sensor for detecting a rotational angle of the electric motor 12. The electric motor 12 is so constituted to output a magnetic pole signal in response to change in magnetic pole in accordance with rotation of a permanent magnet 18a which is secured to an output shaft of the electric motor 12, as shown in FIG. 2. It may be so arranged that a couple of magnetic pole sensors are provided so as to continue the steering control operation, even if malfunction occurs with respect to one of the sensors. Or, in lieu of the magnetic pole sensor 18, a conventional rotary encoder may be employed. As a device for detecting an absolute steering angle of the rear road wheels 15, 16, the rear steering angle sensor 21 is provided for detecting the movement of a rack 25 of the rear steering mechanism 11. The rear steering angle sensor 21 is provided with a Hall IC, which outputs a signal indicative of a steering position in accordance with an amount of movement of a permanent magnet 21a which is mounted on the rack 25 as shown in FIG. 2. Accordingly, after a neutral position of the rear steering angle is set in response to a signal detected by the rear steering angle sensor 21, a relative steering angle is produced by the magnetic pole sensor 18. As a result, an actual steering angle of the rear road wheels 15, 16 is produced by the magnetic pole sensor 18 and the rear steering angle sensor 21.

The electronic control unit ECU includes a micro computer 1, a power unit 4, and interfaces IF1, IF2, as shown in FIG. 4. The micro computer 1 is provided with an A/D converter, a timer and a serial communication circuit (not shown). The power unit 4 is provided for supplying a stable voltage (5V) to an input port VCC of the micro computer 1. The power unit 4 includes a reset circuit, which feeds a reset signal into an input port RST of the micro computer 1 when the power is supplied, or when the power voltage is decreased. The power unit 4 further includes a watchdog (W/D) timer circuit which watches malfunction on the basis of a signal fed from an output port RP of the micro computer 1 at constant time intervals, and which feeds the reset signal into the input port RST in case of the malfunction. The interfaces IF1, IF2 are signal processing circuits which perform waveform shaping, amplifying and level adjusting of signals. Output signals (γ, δ1, δ2, Vw, Vm) of the yaw rate sensor 24, front steering angle sensor 17, steering wheel angle sensor 20, wheel speed sensor 22 and vehicle speed sensor 23 are fed into input ports of the micro computer 1 through the interface IF1, respectively. Since the signals indicative of the front steering angles δ1, δ2 and yaw rate γ are analogue signals, they are sampled every predetermined time period, and fed into the A/D converter of the micro computer 1 to be stored therein.

According to the present embodiment, the electronic control unit ECU and the servo unit SVU are connected through communication lines TXD, RXD. That is, the communication line TXD and the communication line RXD are connected to the serial communication circuit in the micro computer 1 through the interface IF2, so that a signal is transmitted from an output port PTX of the micro computer 1 as shown in FIG. 5, and received at an input port PRX of the micro computer 1, so that information signals are communicated between the electronic control unit ECU and servo unit SVU. The electronic control unit ECU is not limited to an electronic control unit specifically provided for the rear wheel steering, but may be employed as an electronic control unit for controlling a vehicle chassis system as a whole, or as an electronic control unit provided for an anti-lock control, traction control, suspension control, etc.

As shown in FIG. 5, the servo unit SVU includes therein a micro computer 8, a power unit 71, an interface IF3, a resistor R1, drivers DV2, DV3, and a relay driver 6. The micro computer 8 includes an A/D converter and a serial communication circuit (not shown). The power unit 71 is provided for supplying a stable voltage (5V) to an input port VCC of the micro computer 8, and includes a reset circuit which resets when the power is supplied or when the voltage is decreased, and a watchdog timer circuit (not shown) which watches malfunction on the basis of a signal fed from an output port RP of the micro computer 8 at constant time intervals, so that reset signals are fed from those circuits into an input port RST of the micro computer 8. The relay driver 6 is driven in accordance with the result of AND logic of two signals, i.e., a relay driving signal output from an output port RLY of the micro computer 8, and a servo unit enabling signal ENB output from the micro computer 1 in the electronic control unit ECU. As a result, a relay 3 is actuated, so that the voltage of the battery 2 is applied to the servo unit SVU through a power line PIG. The servo unit enabling signal ENB is a signal for determining whether the electronic control unit ECU drives the electric motor 12 in response to communicating conditions, or not. If the communication is being made normally, a high-level signal is output, while a low-level signal is output when malfunction of the communication has been found.

The servo unit SVU includes an interface IF3 which is a signal processing circuit which performs waveform shaping, amplifying and level adjusting of signals. A servo unit enabling signal ENB, which is output from the electronic control unit ECU, is fed into the input port RST of the micro computer 8 through the interface IF3. When the servo unit SVU is communicated with the electronic control unit ECU, a signal is transmitted from an output port PTX of the micro computer 8 and received at an inlet port PRX. The driver DV2 includes an amplifier 74, current-level detectors MS, MOC, a voltage increasing circuit 75, a logic circuit 72, a current-limit circuit CL1, CL2, a high-side gate driver 76 and a low-side gate driver 77. The driver DV3 includes six switching units U11, U12, U13, U21, U22, U23 which comprise switching elements (power MOS FET) and diodes for protecting the elements, and output sides of which are connected to each terminal of three phase coils U, V, W of a star connection of the electric motor 12, respectively. The resistor R1 produces a voltage in accordance with a current fed to the driver DV3, and the voltage is amplified by the amplifier 74. The current-level detectors MS, MOC are provided for comparing the output voltages of the amplifier 74 with threshold values "ref1" and "ref2", respectively, to determine whether the current is excessive or not. The output signals S1 and S2 of the current-level detectors MS, MOC are fed to the input ports PMS, PMO of the micro computer 8 and the current-limit circuits CL1, CL2. The output side of the amplifier 74 is directly connected to an input port MI, and the downstream side of the resistor R1 is directly connected to an input port PIGM, so that the voltages at those sides are fed to the micro computer 8.

In order to drive the electric motor 12, it is necessary to feed the current to each position between paired terminals, such as U→V, V→W, W→U, V→U, W→V, U→W, and then switch the terminals to be fed one after another. In the present embodiment, therefore, a pair of switching units out of six switching units U11, U12, U13, U21, U22, U23 are electrically connected with each other to supply the current to each position between the respective pair of terminals. In this case, if such pairs of the terminals as the switching units U11 and U21, U12 and U22, U13 and U23 are electrically connected with each other simultaneously, the power lines PIG and PGND will be shorted, which must be avoided. According to the present embodiment, however, in response to output signals from output ports LA1, LB1, LC1, LA2, LB2, LC2 of the micro computer 8, the current is fed to the position between the paired terminals of the electric motor 12, so that normally no short is caused between the power source lines PIG and PGND. Furthermore, a combination of output signals is determined at the logic circuit 72 to control the system in such a manner that any combinations of elements such as U11 and U21, U12 and U22, U13 and U23 would not be electrically connected simultaneously, even if malfunction was caused in the micro computer 8. Since the servo unit enabling signal ENB is fed into the logic circuit 72 from the interface IF3 through a line BK in FIG. 5, it may be so constituted as to hold the electric motor 12 electromagnetically. A driving torque of the electric motor 12 is controlled by PWM (Pulse Width Modulation) control of a driving current which is fed into each coil. That is, a PWM signal for determining a width of the driving signal is output from the output port PWM of the micro computer 8. In the logic circuit 72, there is formed a PWM composite circuit in which the PWM signal and phase switching signals output from the output ports LA2, LB2, LC2 are composed to produce control signals to the switching units U21, U22, U23 as illustrated at the lower side in FIG. 5.

The phase switching signals output from the output ports LA1, LB1, LC1 of the micro computer 8 are fed into each gate terminal of the switching units U11, U12, U13, respectively, through the logic circuit 72, the current limit circuit CL1 and the high-side gate driver 76. Whereas, the phase switching signals output from the output ports LA2, LB2, LC2 are fed into each gate terminal of the switching units U21, U22, U23, respectively, through the PWM composite circuit, current limit circuits CL1, CL2 and low-side gate driver 77. Accordingly, each of the switching units U11, U12, U13, U21, U22, U23 is controlled in response to a level of a signal fed into each gate terminal. The voltage increasing circuit 75 is a circuit for applying the increased voltage to the high-side gate driver 76, and outputs the increased voltage to an input port CHV of the micro computer 8. The magnetic pole sensor 18 of the present embodiment is provided for detecting a position of the magnetic pole of a rotor of the electric motor 12, and a detected signal is fed into input ports HA, HB, HC of the micro computer 8, which determines the position of the magnetic pole on the basis of the detected signal, and which outputs the phase switching signal from the output ports LA1, LB1, LC1, LA2, LB2, LC2 on the basis of the position of the magnetic pole. And, the output signal from the aforementioned rear steering angle sensor 21 is fed into the micro computer 8 through the input ports HS1, HS2, so that the actual steering angle of the rear road wheels 15, 16 is produced on the basis of an initial value of the steering angle which is set in response to a signal detected by the rear steering angle sensor 21, and a varying amount of the steering angle (i.e., relative steering angle) which is produced in response to an output signal of the magnetic pole sensor 18.

Figure 6:
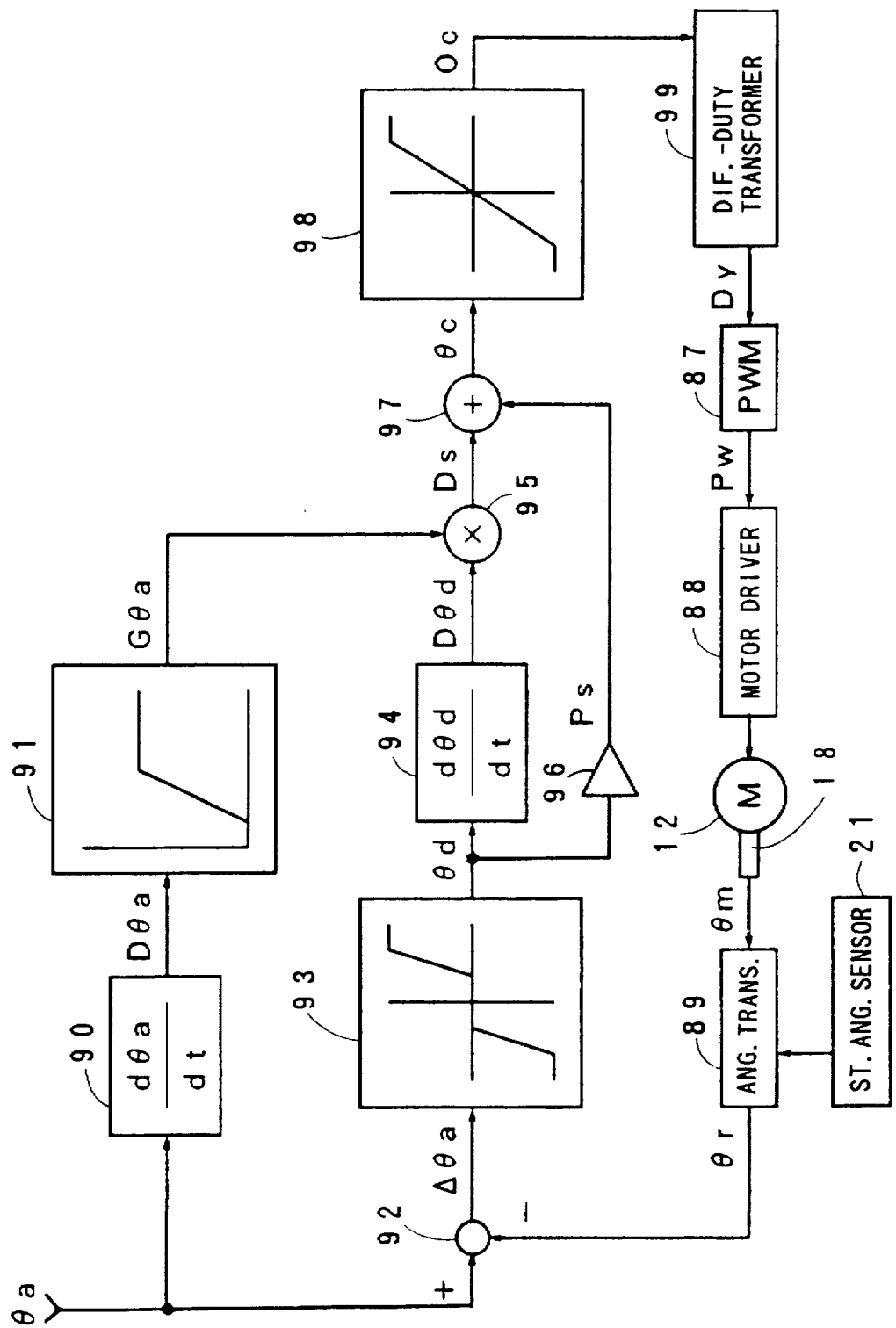
FIG. 6 is a block diagram for a servo control of a motor according to the first embodiment of the present invention.

According to the servo unit SVU, the servo control to the electric motor 12 is performed on the basis of a desired steering angle, and in accordance with the block diagram as shown in FIG. 6. At the outset, the desired steering angle "θa" provided in the electronic control unit ECU is calculated in a conventional manner known heretofore, and differentiated at a derivative section 90 to provide a differential value "Dθa", on the basis of which a differential gain "Gθa" is produced in accordance with a predetermined characteristic. That is, if the absolute value of the differential value "Dθa" is equal to or less than a predetermined value (e.g., 4 deg/sec), the differential gain "Gθa" is set to a predetermined value (e.g., 0), while the absolute value of the differential value "Dθa" is equal to or more than a predetermined value (e.g., 12 deg/sec), the differential gain "Gθa" is set to a predetermined value (e.g., 4). Therefore, when the absolute value of the differential value "Dθa" is in a range of 4 to 12 deg/sec, the differential gain "Gθa" is set to a value between 0 and 4. A rotational angle "θm" of the electric motor 12 is detected by the magnetic pole sensor 18 to output an actual steering angle "θr", through a steering angle transforming section 89, to be fed into a subtracting section 92. The output of the magnetic pole sensor 18 is not a signal indicative of the actual steering angle, but a signal indicative of a relative steering angle as described before. However, the output of the magnetic pole sensor 18 is modified by the output of the rear steering angle sensor 21 at the steering angle transforming section 89, so that the actual steering angle "θr" is output from the steering angle transforming section 89.

Accordingly, the actual steering angle "θr" is subtracted from the desired steering angle "θa" at the subtracting section 92 to produce a steering angle difference "Δθa", which is processed through a blind zone applying section 93, by which an output difference "θd" is set to be zero when the absolute value of the steering angle difference "Δθa" is equal to or smaller than a predetermined value α. Thus, it is arranged to stop the steering control when the value of the steering angle difference "Δθa" is small. The difference "θd" is fed to the derivative section 94 and also fed to a proportional section 96, where the difference "θd" is multiplied by a certain proportional gain to produce a proportional element Ps. At the derivative section 94, the difference "θd" is deviated to produce a differential value "Dθd", which is multiplied by a differential gain "Gθa" at a multiplying section 95 to produce the differential element Ds.

Then, the proportional element Ps and the differential element Ds are summed at a summing section 97 to produce a controlled steering angle, i.e., steering angle "θc", to which an angular limit is applied at a steering angle difference limiter 98 to provide a controlled amount Oc in proportion to the steering angle "θc", and limit the controlled amount Oc to fall within a range which is smaller than a predetermined upper limit (e.g., 1.5 deg) and greater than a predetermined lower limit (e.g., −1.5 deg). The controlled amount Oc is transformed into a duty Dy at the difference-duty transformer 99 to feed the duty Dy to a pulse width modulation (PWM) section 87, which produces a pulse signal Pw in response to the duty Dy to feed the pulse signal Pw to a motor driver 88. Accordingly, the electric motor 12 is servo-controlled by the motor driver 88 in response to the pulse signal Pw. Thus, the above-described servo control is of a proportional and derivative (PD) control, which may be added by an integral element.

Figure 7:
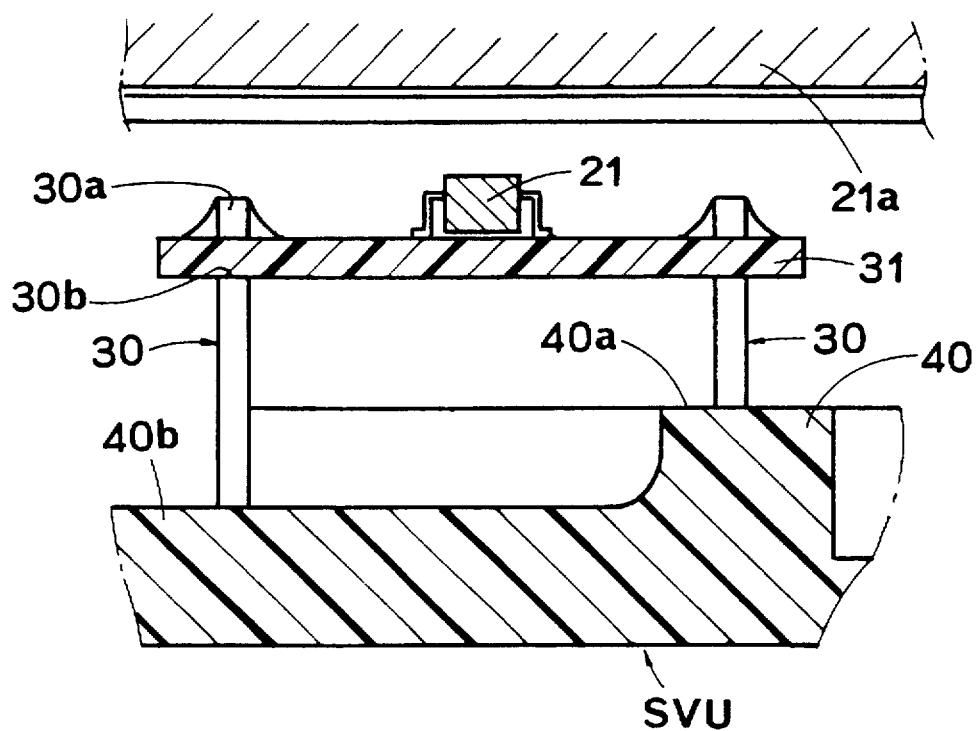
FIG. 7 is a sectional view sectioned along a line A—A in FIG. 3, illustrating an enlarged portion of a supporting mechanism of a steering angle sensor according to the first embodiment of the present invention.
Figure 8:
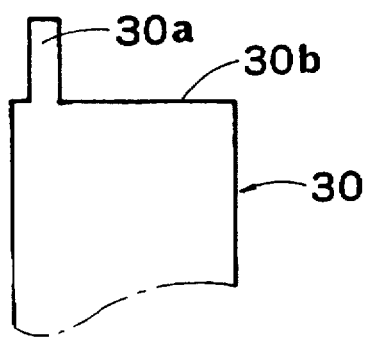
FIG. 8 is a front view of a support member provided for the first embodiment of the present invention.
Figure 9:
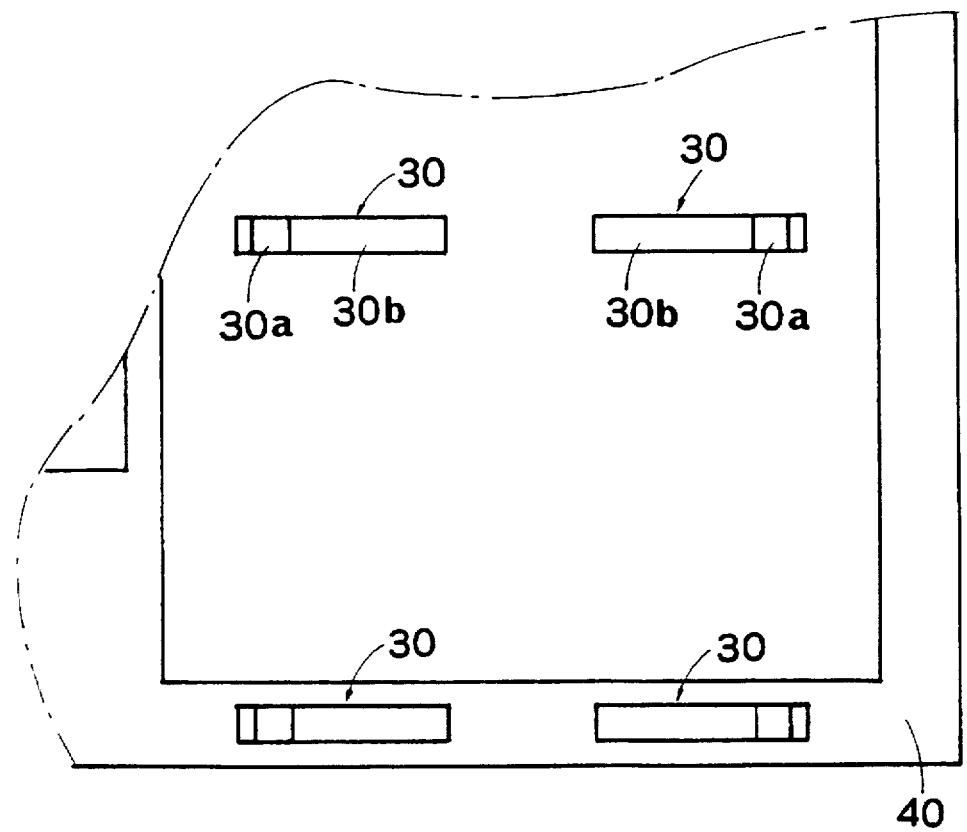
FIG. 9 is a plan view of a supporting portion of the steering angle sensor as shown in FIG. 7 with a base plate removed therefrom.
Figure 10:
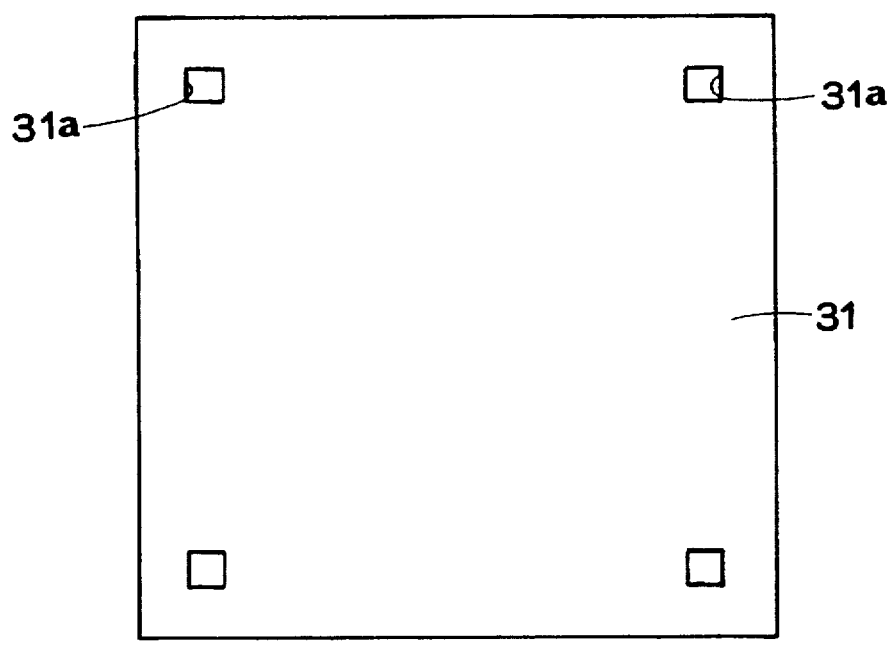
FIG. 10 is a plan view of a base plate provided for the first embodiment of the present invention.

The rear steering angle sensor 21 is arranged as shown in FIGS. 2 and 3, and installed in the servo unit SVU as explained hereinafter with reference to FIGS. 7-10. On a surface of a housing 40 of the servo unit SVU facing the permanent magnet 21a as shown in FIG. 7, support members 30, one of which is illustrated in FIG. 8, are mounted by insert molding as shown in FIGS. 7 and 9. Each of the support members 30 is a metallic plate, for example, which is formed in such a configuration with its front view as shown in FIG. 8 and its plan view as shown in FIG. 9 to provide a protrusion 30a of a column having a rectangular cross section and extending axially from an end face 30b. According to the present embodiment, a stepped portion is formed in the housing 40 as shown in FIG. 7 to provide an upper step 40a and a lower step 40b, in which a base portion of each of the support members 30 is embedded such that the end face 30b of each of the support members 30 is arranged in parallel with a planar surface of the permanent magnet 21a facing the end face 30b. The rear steering angle sensor 21 is fixed on a base plate 31 as shown in FIG. 10 which omits the rear steering angle sensor 21 and only illustrates the base plate 31. The base plate 31 is a rectangular plate having rectangular or square holes 31a formed at its four corners. The protrusion 30a of each of the support members 30 is inserted into each of the holes 31a of the base plate 31, and each protrusion 30a is secured to the base plate 31 with the end face 30b contacting the base plate 31.

As a result, the base plate 31 is installed in the housing 40 with a certain distance apart from the permanent magnet 21a and in parallel therewith, so that a clearance between the rear steering angle sensor 21 and the permanent magnet 21a is made constant. Thus, the support members 30 are secured to the housing 40 by insert molding, in such a condition that the base plate 31 contacts the end face 30b of each of the support members 30, so that the clearance between the rear steering angle sensor 21 and the permanent magnet 21a can be controlled accurately.

It should be apparent to one skilled in the art that the above-described embodiment is merely illustrative of but one of the many possible specific embodiments of the present invention. For example, the electronic control unit ECU and servo unit SVU may be formed as one body and installed in the vicinity of the rear steering mechanism 11 together with the rear steering angle sensor 21. Furthermore, the above-described embodiment is applicable to the one to be installed near the front steering mechanism 10, with a unit of the electronic control unit ECU and servo unit SVU arranged in the vicinity of the rack 10a. Numerous and various other arrangements can be readily devised by those skilled in the art without departing from the spirit and scope of the invention as defined in the following claims.

What is claimed is:

1. A steering control apparatus for an automotive vehicle comprising:

a road wheel to be controlled;

a steering mechanism linked with said road wheel;

an actuator for actuating said steering mechanism;

a steering angle sensor arranged in the vicinity of said steering mechanism for detecting a steered position of said road wheel;

a first electric control circuit for setting a desired steering angle of said road wheel; and a second electric control circuit electrically connected to said first electric control circuit for controlling a current to be fed into said actuator in response to a difference between said desired steering angle and an actual steering angle produced on the basis of said steered position, to control a steering angle of said road wheel, said second electric control circuit being formed in a body with said steering angle sensor and being directly electrically connected with the steering angle sensor, said second electric control circuit being arranged in the vicinity of said steering mechanism.

2. A steering control apparatus for an automotive vehicle as set forth in claim 1, wherein said second electric control circuit is arranged next to said actuator, and is electrically connected to said actuator through a connector.

3. A steering control apparatus for an automotive vehicle as set forth in claim 1, further comprising communication means which electrically connects said first electric control circuit with said second electric control circuit through a communication circuit.

4. A steering control apparatus for an automotive vehicle as set forth in claim 1, wherein said steering angle sensor includes a Hall IC, and wherein said steering mechanism includes a permanent magnet arranged to face with said Hall IC.

5. A steering control apparatus for an automotive vehicle as set forth in claim 1, further comprising:

a housing provided at a certain position relative to said steering mechanism;

a plurality of support members each having one end fixed to said housing, and the other end extending toward said steering mechanism; and a base plate for mounting thereon said steering angle sensor and said second electric control circuit, each of said support members having an engaging portion for supporting said base plate at a predetermined position remote from said steering mechanism by a certain distance.

6. A steering control apparatus for an automotive vehicle as set forth in claim 5, wherein each of said support members is formed by a plate, one end of which is secured to said housing, and the other end of which is formed with a protrusion extending toward said steering mechanism.

7. A steering control apparatus for an automotive vehicle as set forth in claim 6, wherein said one end of each of said support members is embedded in said housing.

8. A steering control apparatus for an automotive vehicle as set forth in claim 6, wherein said base plate has a plurality of holes into which said protrusion of each of said support members is inserted, respectively.

9. A steering control apparatus for an automotive vehicle as set forth in claim 8, wherein said base plate is a rectangular plate having said holes formed at each corner of said rectangular plate.

10. A steering control apparatus for an automotive vehicle as set forth in claim 5, wherein said engaging portion of each of said support members is formed on an end face thereof which contacts said base plate.

* * * * *